June 24, 1958 — G. CURRIE — 2,840,769
ELECTROMAGNETIC OPERATOR
Original Filed Oct. 3, 1951 — 3 Sheets-Sheet 1

WITNESSES:

INVENTOR
Gilbert Currie.
BY
ATTORNEY

June 24, 1958   G. CURRIE   2,840,769
ELECTROMAGNETIC OPERATOR
Original Filed Oct. 3, 1951   3 Sheets-Sheet 3

WITNESSES:

INVENTOR
Gilbert Currie.
BY
Paul E. Friedemann
ATTORNEY

United States Patent Office 2,840,769
Patented June 24, 1958

2,840,769
ELECTROMAGNETIC OPERATOR

Gilbert Currie, Williamsville, N. Y., assignor to Westinghouse Electric Corporation, East Pittsburgh, Pa., a corporation of Pennsylvania Original application October 3, 1951, Serial No. 249,497, now Patent No. 2,747,698, dated May 29, 1956. Divided and this application August 23, 1955, Serial No. 530,162

6 Claims. (Cl. 317—198)

This invention is a division of the applicant's copending application, Serial No. 249,497, now Patent No. 2,747,698, entitled Brake, filed October 3, 1951, and assigned to the assignee of this invention. The aforesaid application relates generally to brakes and is particularly directed to a brake which compensates brake wear, misalignment of parts and requires no adjustment throughout the useful life of the brake shoes or lining.

The divisional subject matter of this application is directed particularly to an electromagnetic operator employed in the brake of the parent application for releasing the brake, that is, disengaging the brake shoes from the brake wheel by energization of the electromagnet.

In certain of its general aspects this invention is related to certain features of applicant's Patents 2,514,378 and 2,685,945 and in other of its aspects this invention is related to applicant's Patent 2,752,010, all the aforesaid items being assigned to the assignee of this invention.

This invention, in one form of embodiment is illustrated in connection with an electric brake of the double block type in which the moving system of the electromagnet is spring loaded to apply the braking torque and the moving system is electromagnetically operated against the spring or braking torque to move the brake to disengaged position.

The present invention by way of illustration, but without limitation is illustrated in application to a double block type of brake wherein the utility of the novel features of the electromagnetic operator are readily apparent.

In the usual case, double block brakes comprise a brake wheel and have brake arms on opposite sides of the brake wheel, which carry the brake shoes adjacent their extremities. The brake is set by a compression spring and a link system connecting the free extremities of the brake arms. This forces the brake arms together, and the brake is usually released by means of a bell crank having its middle fulcrum on the brake arm extremity adjacent the compression spring, and one end thereof attached to the link. Force applied in the proper direction to the remaining extremity of the bell crank, drives the free extremities of the brake arms apart and releases the brake. Frequently on double block brakes, the bell crank is actuated by a solenoid.

Most brakes of this general type have three adjustments, one for varying the torque, and hence, for varying the braking and releasing effort by varying the amount of spring compression, one for equalizing the shoe clearances, usually by means of separate adjustments on the shoes, and the third for adjusting the stroke or travel of the solenoid or electromagnet plunger or armature.

While these adjustments may vary for different types of brakes, they are essentially the same. In the typical case, after the brake is mounted in position, it is necessary to make most, and usually all of these adjustments, and the successful operation of the brake depends upon the skill with which the adjustments are made.

These adjustments, under ideal working conditions, ordinarily require a fair degree of skill, to obtain the most efficient operation of the brake. In many instances, however, brakes are installed in out-of-the-way places where lighting is poor and where the space is cramped. Under these conditions, it is extremely difficult to make the three adjustments hereinabove mentioned. In such instances, the brake is usually always out of adjustment and maximum operating efficiency is therefore not obtained.

Initial adjustments, however, hold only for the thickness of the new brake shoe lining. As the brake is used and the linings are worn, the brake is continuously moving out of adjustment. When the lining has worn an amount equal to the initial shoe clearances, the travel of the armature or solenoid plunger has been doubled, and it is usually necessary to readjust the brake to restore the travel to its original amount. If the adjustments are not made at the proper time, or are not properly made, brake failures evidenced in excessive heating and burned out solenoid coils may result.

Due to the facility of adjustment of the brake of this invention at the time of manufacture, and due to the fact that this brake automatically adjusts itself during operation, it will be appreciated that brake failures may be minimized with no maintenance time and effort being required other than to replace worn out lining. In accordance with another feature of this invention, movement of certain specified parts of the brake to given limit positions may be utilized by suitable, visual, or audible indicating means, to signal the operator that the brake must be relined.

The certain specified parts referred to in the preceding paragraph may include the brake operating lever or levers and the plunger of the solenoid or electromagnet used to operate the brake. As the brake lining wears the angular position of the brake operating lever changes in such sense as to continuously move the plunger or armature away from the core. This increases the open gap position of the armature which may increase to the point where the flux linkage between the core and armature is insufficient to attract the armature to the core and release the brake. The electromagnet assembly of this invention overcomes this problem in the provision of a linkage between the electromagnet armature and the brake operating lever system affording a disengageable connection between the armature and the brake lever system such that the length of the armature stroke is maintained constant throughout the range of brake lever angular positions with brake lining thickness variations over the useful life of the brake lining.

In accordance with the foregoing considerations, it is generally one object of this invention to provide an electromagnetic operator of the character generally referred to, which is simple in its elements with respect to operational requirements and consistent in its operation.

It is also a general object of this invention to provide an electromagnetic operator of the character referred to which may be factory adjusted and which requires no adjustment after it is placed in operation.

A more specific object of this invention is to provide an electromagnetic operator of the class generally referred to in which the distance of travel of the plunger or electromagnet armature in operating a member to be controlled is constant and is always confined to the same definite path, irrespective of change in position of the controlled member to thereby eliminate overtravel and side pull of the plunger or armature.

The foregoing statements are merely illustrative of the various aims and objects of this invention. Other objects and advantages will become apparent from a study of the following specification, when considered in conjunction with the accompanying drawings, in which.

Figure 1:
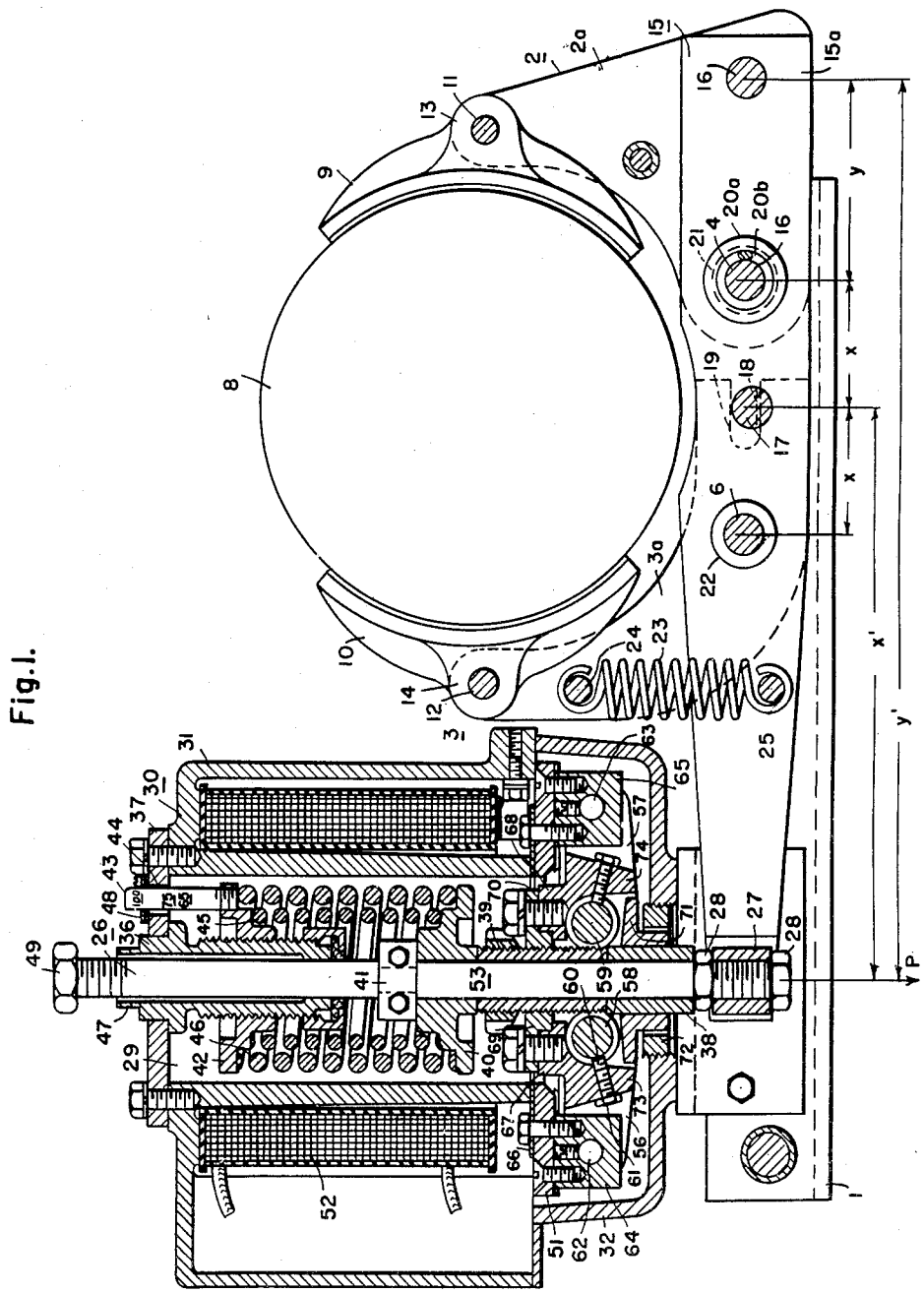
Figure 1 is a longitudinal sectional view of a brake assembly embodying the features of this invention.

The novel aspects of the electromagnetic operator of this invention will be better understood from a consideration of the details of the brake assembly in which it is applied.

The various components of the brake assembly are mounted upon a support or base section comprising a pair of spaced parallel angles 1. These angles are suitably spaced apart to receive therebetween the various levers of the brake linkage system. At the right end of the base of the brake, as viewed in Figures 1 and 2, there are mounted two brake arm assemblies, generally designated, 2 and 3. These brake arm assemblies comprise a pair of similar levers, respectively designated 2a and 2b, and 3a and 3b. Brake arm levers 2a and 2b, are pivotally connected between the vertical flanges of the base angles by means of a shaft 4, provided with reduced diameter, threaded end sections, which clear through suitably positioned holes in the mentioned vertical flanges of the base section, and which are secured by means of nuts 5, which thread thereover. Brake arms 3a and 3b are similarly pivotally secured between the vertical flanges of the base angles by means of a shaft 6, the ends of which extend through the vertical flanges and have threaded thereover nuts 7.

These brake arm assembly pivot mountings, for the respective brake arm assemblies, are arranged in suitably spaced relation along the base section and as seen in Figure 1, vertical extensions of the brake arms project upwardly on each side of a brake wheel 8.

Brake shoes 9 and 10 are respectively pivotally connected to the upper extremities of the respective brake arm assemblies 2 and 3 by means of respective pivot pins 11 and 12, which extend through respective bosses 13 and 14 on the brake shoes and engage the upper ends of the respective levers of the brake arm assemblies. As a general rule, sufficient frictional restraint in this pivotal mounting of the brake shoes on the brake arms is provided so that the shoes do not rotate due to their own weight, whenever the brake arms are moved to brake released position. The brake shoes are properly aligned by movement of the brake arms to a position in which the brake shoes engage the wheel. The frictional restraint is overcome due to the force of this engagement and the brake shoes are properly oriented with respect to the wheel, and maintain this position in the brake released position.

A lever assembly generally designated 15, is connected to each brake arm assembly at a point on each assembly which is displaced from the respective points of pivoting of the brake arm assemblies on the base. The point of connection of lever assembly 15, with brake arm assembly 2 is designated 16, which is represented in a pin extending through both sections 15a and 15b of lever 15, and terminating in the respective levers 2a and 2b of brake arm assembly 2. A pin 17, which extends through, and is secured in both lever sections 15a and 15b of the lever assembly 15, is provided with a flat bottom face 18, and the vertical dimension as seen in Figure 1, of the respective ends of the pin is such as to fit into and slidably engage the edges of respective slots 19, provided in the remaining corresponding extremities of the brake arm assembly 3.

Figure 2:
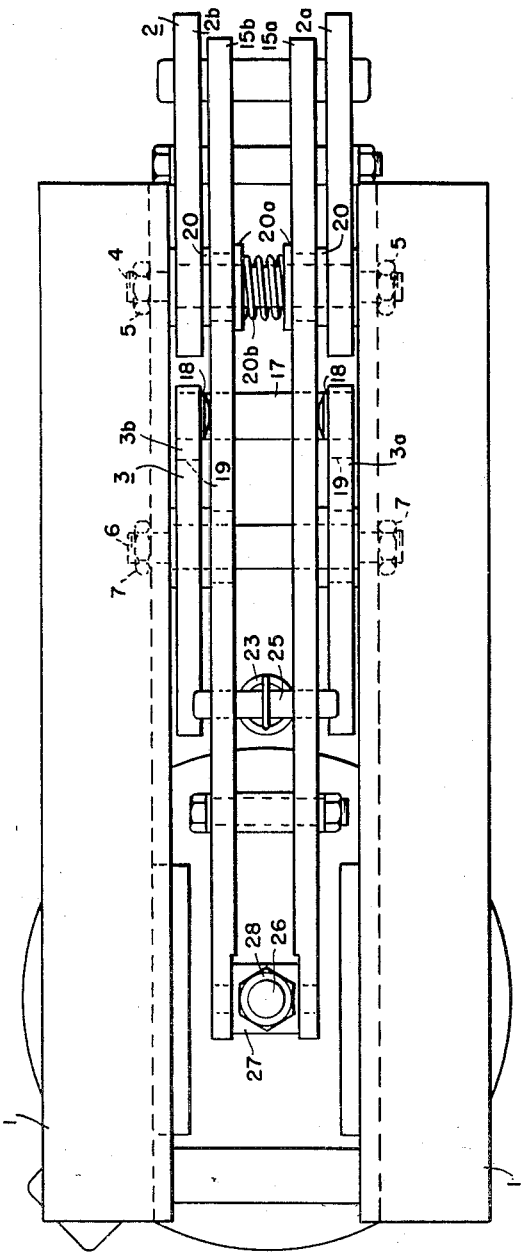
Figure 2 is a bottom view of Figure 1, illustrating certains details of the brake linkage.
Figure 3:
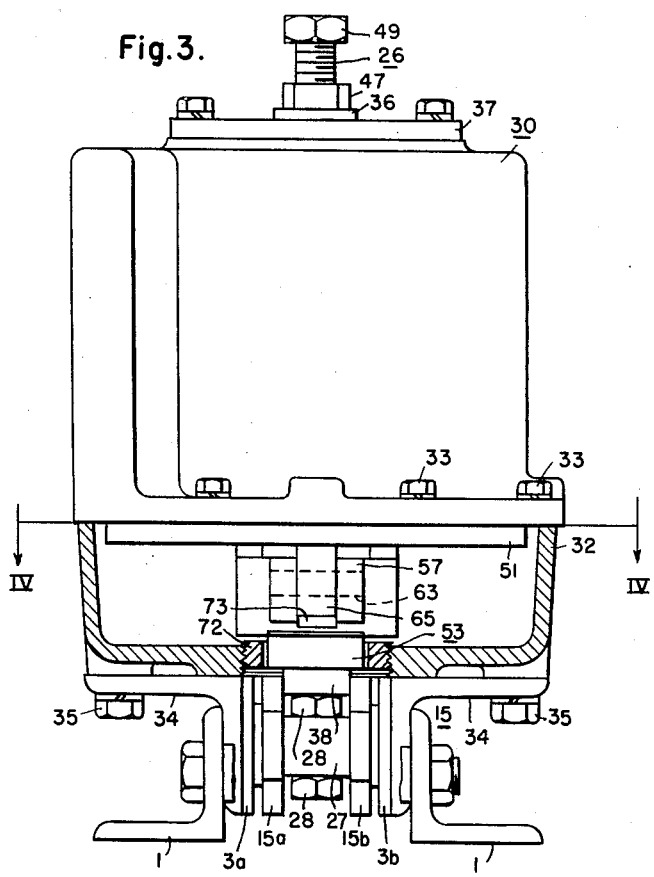
Fig. 3 is an end view of the brake assembly of Figure 1, as viewed from the right end of the brake, which view illustrates certain other detailed features of the brake linkage and general construction.

As will be seen by reference to both Figure 1 and Figure 2, lever assembly 15, comprises a pair of spaced, parallel straight bars, 15a and 15b, of rectangular cross section, for reasons of structural simplicity. In view of this, provision is made through respective holes 21 and 22 in this lever assembly to clear the brake arm pivot pins 4 and 6. Thus it will be appreciated that angular movement of lever assembly 15 is obtainable within the limits imposed by the clearance of the respective holes 21 and 22 about the respective pivot pins 4 and 6.

Since it is desirable in operation of the brake to minimize conditions of back lash due to lost motion in certain of the connections, a spring 23 is connected between pins 24 and 25, respectively mounted on lever assembly 15, and brake arm assembly 3. This spring is under tension and consequently tends to move the pins 24 and 25 together. In so doing the brake arm assembly 3 is biased counterclockwise, as viewed in Figure 1, to a position in which the bottom edge of slot 19, abuts the flat face 18 on the bottom side of pin 17. Also cross piece or trunnion pin 28 whose ends are carried by lever assembly 15 is biased upwardly against the shoulder on the spindle 26.

A frictional connection is provided between the lever assembly 15 and brake arm assembly 2, for the purpose of providing an adjustable connection of lever assembly 15 with brake arm assembly 2 through which limited torque may be applied to actuate the brake arm assembly 2 in a direction to release the brake shoe 9 from the wheel, but which yet provides for relative angular movement between the lever assembly 15 and brake arm assembly 2, when the lever assembly is moved counterclockwise, as viewed in Figure 1, to apply the brake shoe to the wheel. This frictional connection comprises a pair of friction washers or plates 20, which are respectively disposed between the adjacent levers of the brake arm assembly 2 and the lever assembly 15, and further comprises a pair of spring washers 20a, disposed between the adjacent faces of levers 15a and 15b. A compression spring 20b disposed between these spring washers thrusts the levers 15a and 15b apart as seen in Figure 2 and securely engages the respective levers with the respective friction plates or washers 20.

With the construction thus far described, if a downward force is exerted on the left-hand end of lever assembly 15, the lever assembly will tend to pivot about the center of shaft 4 due to the friction device just described and will move in a counterclockwise direction as viewed in Figure 1. Pin 17 will therefore tend to move downwardly and pin 16 will tend to move upwardly. These forces cause the respective brake arm assemblies to rotate about their respective pivot pins 4 and 6, brake arm assembly 2 rotating counterclockwise and brake arm assembly 3 rotating clockwise, to apply the respective shoes to the brake wheel. Since the holes 21 and 22 in lever assembly 15 are provided, it will be appreciated that this small counterclockwise movement of the lever assembly will not be obstructed by the respective brake arm assembly pivot pins 4 and 6.

For a particular location of the wheel, for example, a location of the wheel exactly on the designed center line of the brake, as shown in Figure 1, the lever assembly 15, at the time the brake shoes engage the brake wheel, will occupy a given angular position with respect to the respective brake arms. However, if the brake wheel should be to the right or to the left of this particular position, the lever assembly 15 would occupy a different angular position with respect to the brake arms than that which is illustrated. Under these conditions the angular relationship of the lever assembly 15 with respect to brake arm assembly 2, must change in an amount dictated by the degree of misalignment and this is physically possible since the braking force which is applied to the left end of the lever assembly 15 is sufficient to overcome the friction between lever assembly 15 and brake arm assembly 2.

It will thus be appreciated that braking torque is applied to the brake arms through the connection of the lever system 15 to the respective brake arms at the two points 16 and 17. By proper selection of the various lever arms which are involved in this mechanical linkage, it is possible to obtain equal braking torques as will be shown hereinafter.

It is desirable, although not absolutely necessary in this instance, that any misalignment of the brake wheel with respect to the designed center line of the brake, resulting in angular displacement of the lever assembly 15, shall not result in vertical displacement of the left end of this lever assembly. In the applicant's aforesaid copending application Serial No. 249,498, if such vertical displacement occurs, due to such misalignment, the travel of the brake engaging and brake releasing mechanism is changed to some new value. To offset such a change it would then be necessary to effect an adjustment of the brake mechanism to restore the travel of the brake operating mechanism to its initial condition.

However, in the present brake such vertical displacement merely changes the relative positions of certain components of the brake releasing mechanism, yet to be described and does not affect the travel of such mechanism. Hence, in this instance such displacement will not disturb brake releasing movement although calibration for a given braking torque may be changed to a small extent.

The illustrated linkage system, however, is relatively proportioned in such a manner that the left end of the lever assembly 15 does not move even though misalignment of the brake wheel with respect to the designed center line of the brake may exist.

This will be appreciated from a consideration of the respective lever arms for the condition in which the brake wheel is moved to the left of the designed center line of the brake. Under this condition both brake arm assemblies will be rotated in a counterclockwise direction as viewed. Consequently, both pins 16 and 17 will move upwardly, and the ratio of the movement of the pin 16 to the pin 17 will be proportional to the ratio of the dimension $y$ to the dimension $x$, illustrated in the drawings. If this ratio is properly selected, the distance traveled by each pin will correspond to the distance between the sides of an angle subtended by the angular movement of the lever system 15, which angle has its vertex at the left end of the lever system.

This might be realized as follows: When the lever assembly 15 is rotated about its left end, the pins 16 and 17 move an amount corresponding to the ratio $y'$ to $x'$ of the respective moment arms $y'$ and $x'$. Consequently, if the ratio of $y$ to $x$ is made equal to the ratio of $y'$ to $x'$, any moment of the wheel to the right or to the left of the designed center line will result in a rotation of lever assembly 15 about its left end, and the point to which the force is applied to obtain braking torque will remain stationary and the adjustment or calibration of the brake will not be changed.

The brake is applied by applying a downward force to the left end of the lever assembly 15 along the line of action P to release the brake with the construction provided, an upward force is applied to this same point. Because of the friction produced by the spring pressure engaging the respective levers of the lever assembly, and the brake arm assembly with friction plate 20, upward, force on the left end of the lever assembly 15, rotating this lever assembly in a clockwise direction, will tend to move the brake arm assembly 2 angularly, at the same time the brake arm assembly 3 is moved angularly, in directions to lift the brake shoes from the wheels. The releasing torque, which moves brake arm assembly 2 away from the brake wheel is applied thereto through the mentioned frictional connection between the lever assembly 15 and the brake arm assembly 2. Since there is no restraining force on this brake arm assembly, other than bearing friction, for this direction of movement, it will be appreciated that a relatively small frictional force will be sufficient to accomplish this end.

The pin 17, as indicated by dimensions designated $x$, is disposed midway between the respective brake arm pivot pins 4 and 6, and, inasmuch as rotation of the lever assembly 15 takes place about the axis of the pin 4 during brake releasing movement, it will be appreciated that both brake shoes are moved, in the same amount, away from the brake wheel 8.

With the lever arrangement illustrated, a downward force such as P on the left end of lever assembly 15 produces equal and opposite forces on the brake shoes. Taking moments about the respective pins 16 and 17, the downward force on pin 17 is equal to:

$$\frac{Py'}{y'-x'}$$

The upward force on pin 16 is:

$$\frac{Px'}{y'-x'}$$

The clockwise torque on brake arm 3 is:

$$\frac{Py'x}{y'-x'}$$

The counterclockwise torque on brake arm 2 is:

$$\frac{Px'y}{y'-x'}$$

The ratios of these torques will be:

$$\frac{\frac{Py'x}{y'-x'}}{\frac{Px'y}{y'-x'}} = \frac{Py'x}{Px'y}$$

Since as earlier described herein, the ratio of $y$ to $x$ was made equal to the ratio of $y'$ to $x'$, it will be appreciated that the product of these, inversely related ratios in the final expression, will be unity, which indicates that the torques are equal.

The mechanism for removing lever assembly 15 in brake engaging and brake releasing directions includes a spindle 26 which is pivotally secured at its bottom end to the left end of lever assembly 15 by means of a trunnion pin 27. Trunnion pin 27 straddles the distance between the lever sections 15a and 15b and is provided with a hole therethrough, which is normal to the trunnion axis, through which the bottom threaded end of spindle 26 is fitted. Spindle 26 is secured against rotation in the trunnion 27 by means of a pair of nuts 28 which are threaded thereon, and which clamp the trunnion therebetween.

The spindle extends upwardly through a central cylindrical opening 29 in a magnet housing 30. The magnet housing is comprised of an upper part 31 and a lower part 32. These two sections are secured together on their mating faces by means of bolts 33. This magnet housing is supported by a pair of angle sections 34 which are bolted to the vertical flanges of the base angles 1 and form a platform across their horizontal flanges on which the lower part 32 of the magnet housing is seated and secured by bolts 35.

Spindle 26 is slidably fitted through an externally threaded bushing 36 which is rotatably mounted in the central opening of a cover plate 37 which is bolted across the top of the opening 29 in the magnet housing 31. A pair of sleeves 38 and 39, respectively, are fitted over the spindle 26. Sleeve 38 abuts the upper trunnion nut 28 and sleeve 39 abuts the top end of the sleeve 38. This assembly of sleeves is secured axially of spindle 26 by means of a spring washer 40 which is fitted over the spindle 26 in abutting relation with the upper end of sleeve 39.

Spring washer 40 is secured in its position axially of spindle 26 by means of a clamp 41 which clamps over a reduced diameter section of spindle 26 and abuts the upper end of the spring washer 40. A second spring washer 42 threads over the externally threaded portion of bushing 36 and is drilled and tapped at one point adjacent its peripheral edge to receive a short rod 43, the bottom end of which threads into the mentioned threaded hole. The upper end of this rod projects through a hole 44 in cover plate 37.

Springs 45 and 46 are compressed between respective shoulders on spring washers 40 and 42. The compressive force thrusting the lower spring washer 40 downwardly, which by reason of its secure connection with respect to the spindle 26, drives the spindle 26 downwardly. This downward thrust of the spindle through trunnion pin 27 rotates lever assembly 15 in a counterclockwise direction as viewed in Figure 1, driving pin 17 downwardly and pin 16 upwardly. As previously described, this movement engages the respective brake shoes with brake wheel 8.

The force of engagement of the brake shoes with the brake wheel is adjustable by the threaded bushing 36. It will be recalled that bushing 36 is rotatably mounted in the cover plate 37. The end of this bushing which projects through the cover plate is provided at 47 with flat surfaces to receive a wrench. Rotation of the bushing through the application of a wrench thereto moves the upper spring washer 42 up and down along the threaded portion of the bushing. By reason of the connection of rod 43 with the cover plate through the hole 44, spring washer 42 is stationarily secured against rotation at the time that bushing 36 is rotated. Consequently, the only direction of freedom of this spring washer is axially of the threaded bushing.

Movement of this bushing controls the degree of compression of springs 45 and 46 and consequently, controls the braking torque. The amount of braking torque may be indicated by suitable marks along the rod 43 arranged to indicate the value of torque when the respective marks are adjacent the upper edge of a dust seal 48 secured to the top cover 37 about the rod 43. The indicated position corresponds to 100% braking torque.

Means for mechanically releasing the brake assembly is provided in a nut 49, which threads over the upper end of spindle 26. By rotating this nut downwardly along spindle 26, the nut is brought into engagement with the upper end of bushing 36. Continued rotation of the nut in this direction then pulls spindle 26 upwardly through the magnet housing and moves the lever assembly 15 in a clockwise direction, which as previously described, moves the brake arm and brake shoes in a direction to release the shoes from the brake wheel.

As earlier noted in this discussion, this brake assembly is self-compensating for misalignment of the brake wheel with respect to the designed center line of the brake and for wear of the brake lining. This is accomplished, in general, by an actuating means embodying a linkage which is normally disengaged from the spindle 26 and which occupies a position adjacent the path of movement of the spindle such that displacement of the spindle longitudinally of its axis, does not vary the spacing between the spindle and the actuating means. The actuating means is designed upon operation thereof to engage the spindle during a first portion of its stroke and thereafter during the remaining portion of the stroke to move the spindle upwardly as viewed, to actuate lever assembly 15 in a clockwise direction to release the brake.

Figure 4:
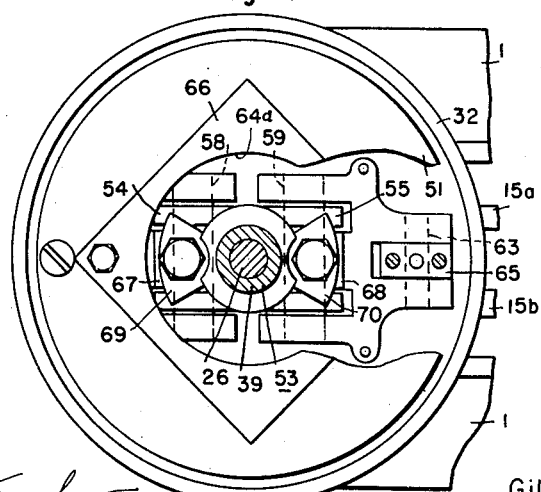
Figure 4 is a view taken on section line IV—IV of Figure 3.

It will be appreciated that numerous mechanical expedients may be employed to effect this general function. The specifically illustrated means embodies a suitable linkage which is actuated by armature member 51 of an electromagnet, the coil 52 of which is disposed within the upper magnet housing 31. Specifically, the linkage comprises a bushing 53 having bearing supports 54 and 55, which is slidably fitted over the sleeves 38 and 39 on spindle 26. As best seen in Fig. 4, bearing supports 54 and 55 extend outwardly on opposite sides of bushing 53. Respective pawl levers 56 and 57 are pivotally mounted by means of pins 58 and 59 in respective bearing supports 54 and 55. The pins are secured with respect to the pawl levers by means of headless set screws 60 which are secured by nuts 61. Diametrically opposite sides of the armature 51 are pivotally connected to the ends of pawl levers 56 and 57 by respective pins 62 and 63 which pass through respective bosses 64 and 65 secured to the bottom side of the armature 51 at diametrically opposite points.

As will be seen by reference to Fig. 1 and Fig. 4, the armature is circular in plan form and is provided with a central opening 64a which clears the linkage. A shim 66 having a central opening therein corresponding in size to the opening 64a in the armature is fitted to the top side of the armature. This shim is of non-magnetic material and is utilized to prevent the armature from sticking due to the residual flux in the magnet core after the coil is deenergized.

Pawl levers 56 and 57 are provided with pawl or clutch seats 67 and 68 respectively, upon which the pawl or clutch pieces 69 and 70 are secured. This assembly is disposed above the bearing supports upon the pawl levers and projects upwardly through the opening 64a in the armature. This is clearly seen in both Figs. 1 and 4.

The faces of the pawl or clutch pieces 69 and 70 which engage the threaded sleeve 39 are of a configuration corresponding to the surface configuration of sleeve 39 to assure positive engagement therewith. In one embodiment the sleeve 39 is provided with threads having a high pitch and the faces of the pawl or clutch pieces are correspondingly shaped to mesh therewith. The mechanism components, as illustrated, including the magnet and armature, occupy relative positions corresponding to an energized condition of the electromagnet coil. In this position, as shown, the pawl or clutch pieces 69 and 70 are both engaged with the sleeve 39.

It will be appreciated from a study of the mechanism hereinabove described that the armature for the electromagnet is carried entirely on the ends of the pawl levers. Thus, when the magnet is deenergized the armature drops downwardly from the bottom of the magnet core. The force of the springs 45 and 46 drives the spindle 26 downwardly carrying with it the bushing 53, the pawl lever system and the armature. The movement of bushing 53 downwardly is arrested by a shoulder 71, which is formed on the bushing adjacent its lower end, which engages an adjustable stop 72 threaded into the bottom of the lower magnet housing 32. The travel of the bushing between its upper and lower positions is controlled by the vertical position of the stop 72 and may be adjusted to any required value within the illustrated limits. It will be appreciated that such adjustment controls the open gap position of the armature and thereafter, until further adjustment of the stop is made, this open gap distance will remain constant.

When the downward travel of bushing 53 is stopped the weight of the armature on the pawl levers 56 and 57 rotates these levers counterclockwise and clockwise, respectively, as viewed in Fig. 1, until such time as webs 73 and 74 on pawl levers 56 and 57 respectively abut the opposite edges of shoulder 71 on the bushing 53. In this position the pawl or clutch pieces 69 and 70 are completely disengaged from the threaded sleeve 39. Consequently, the spindle 26 is released from the armature controlled pawl or clutch linkage and completes its downward travel under the applied force of the compression springs 45 and 46.

The counterclockwise rotation of lever 15 which results from this movement of the spindle rotates the respective brake arms and the brake shoes in such directions as to engage the brake shoes with the brake wheel, the spring force being sufficient to arrest the brake wheel's rotation for any load up to that of the maximum capacity of the brake. The downward movement of the spindle stops at that time when the torques applied to the brake arms by the spring force acting on lever assembly 15 is balanced by the resisting torques of the brake arms due to engagement of the brake shoes with the brake wheel. For a given thickness of brake lining, this point of equilibrium is the maximum downward position which the spindle 26 will occupy.

As the brake shoe lining wears, the ends of the brake arms which carry the brake shoes will move closer to the brake wheel. Due to the connection of the lever assembly 15, with the respective pins 16 and 17 on the brake arms, the lever assembly 15 is free to rotate further in a counterclockwise direction. As a consequence, the downward travel of the spindle increases as the brake lining wears. When the armature is in its full downward position, the spindle as previously described is completely disengaged therefrom and consequently there is no restraint of spindle movement other than due to brake shoe pressure on the brake wheel.

Thus, a relative displacement in the longitudinal position of the spindle with respect to the engaging faces of the pawl or clutch pieces 69 and 70 occurs, but there is no change in the dimension between the faces of the pawl or clutch pieces 69 and 70 and the surface of the threaded bushing 39 engaged by these pieces. Thus with each stroke of the armature upwardly, assuming a certain degree of brake lining wears with each application of the brake, the pawl pieces 69 and 70 may engage the bushing 39 at any point along the length thereof.

Throughout this operation it will be appreciated there is no change in the travel of the armature. During the first interval of armature travel the pawl levers 56 and 57 are rotated clockwise and counterclockwise respectively until the faces of the pawl or clutch pieces 69 and 70 engage the threaded sleeve 39. Angular movement of the pawl levers then stops and continued movement of the armature upwardly, due to its linkage with the magnetic field of the electromagnet, then carries the spindle 26 and the levers connected thereto, upwardly to move the brake to its released position.

It will now be appreciated that according to the structure of this invention means are provided whereby the force which releases the brake has a definite path of travel and that the length of this path is constant whether the brake linings are worn evenly or unevenly or completely worn out or, whether the brake wheel has expanded from heat or contracted from cold. The arrangement is such through the special compensating features to provide equalized shoe clearance under all of the named conditions.

It will be appreciated that the force of the springs decreases with shoe lining wear and the spindle moves downwardly a greater distance with each application of the brake. For that reason the two springs 45 and 46 are utilized, one inside the other, the combined scale of which is low enough so that the variation in torque ranges from 5% high for new linings to 5% low when the linings are fully worn, giving a total variation in torque of only 10% over the full life of the brake linings.

Suitable means may be provided for indicating the extent of brake lining wear. Such means may be visual and of the form of a scale (not shown) adjacent the spindle 26. Other means may involve a suitable electrical device actuated by the spindle at a predetermined point in downward travel of the spindle 26 or of lever assembly 15, which electrical device controls a suitable audible, visual, or both, signaling device.

Although but one mechanical arrangement embodying this invention has been illustrated herein, it will be appreciated that numerous other expedients, in the nature of mechanical equivalents, may be employed to achieve the results herein accomplished. For example in connection with the brake releasing mechanism, the general requirement therein is that the brake releasing clutch or pawl system be frictionally released from the brake control lever when the magnet is deenergized, and that there shall be substantially no relative movement with regard to spacing of the clutch parts as the clutch element connected with the brake control lever moves to new positions with wear of the brake shoe lining. Additionally, the configuration of the clutch faces may be subjected to considerable change depending upon the axial load on spindle 26 and the materials from which the clutch elements are made. Under certain conditions, smooth clutch faces may be utilized with success. While many brakes are designed for electric control there are nonetheless many applications where electric control may not be feasible and so other means such as hydraulic or manual force may be utilized to actuate the mechanism.

It is therefore intended that this disclosure shall include such and other equivalent detail variations in the subject matter disclosed and that such subject matter together with the illustrations of the drawings shall be considered only as illustrative of the principles of this invention and not interpreted in a limiting sense.

The invention claimed is:

1. An electromagnetic device, comprising a core having an opening therethrough a coil disposed about said core, the axis of said opening substantially paralleling the axis of said coil, a rod slidably mounted in said opening, a member slidably fitted over said rod, an armature having an opening therein, said armature being disposed about said rod adjacent said core, and a lever pivotally connected to said armature and to said member, said lever having a portion thereon positively engageable with said rod upon movement of said armature toward said core when said electromagnet is energized.

2. An electromagnetic device, comprising, a core having an opening therethrough a coil disposed about said core, the axis of said opening substantially paralleling the axis of said coil, a rod slidably mounted in said opening, a member slidably fitted over said rod, an armature having an opening therein, said armature being disposed about said rod adjacent said core, bearing supports on opposite sides of said member, a pawl lever pivotally mounted in each bearing support and pivotally connected to the armature at another point on the pawl, said pawl being at times positively engaged with said rod, and a stop for limiting movement of said member away from said armature.

3. An electromagnetic device, comprising: a core having an opening therethrough a coil disposed about said core, the axis of said opening substantially paralleling the axis of said coil, a rod slidably mounted in said opening, a member slidably fitted over said rod, an armature having an opening therein, said armature being disposed about said rod adjacent said core, a threaded section on said rod, bearing supports on opposite sides of said member, a pawl lever pivotally mounted in each bearing support and having a face portion of a configuration to fit against said threatened section, said face portion being normally disengaged from said threaded section, and means pivotally connecting each pawl lever to said armature.

4. An electromagnetic device, comprising: a core having an opening therethrough, a coil disposed about said core, the axis of said opening substantially paralleling the axis of said coil, a rod slidably mounted in said opening, a member slidably fitted over said rod, an armature having an opening therein, said armature being disposed about said rod adjacent said core, a threaded section on said rod, bearing supports on opposite sides of said member, a pawl lever pivotally mounted in each bearing support and having a face portion of a configuration to fit against said threaded section, said face portion being normally disengaged from said threaded section, and stop means for limiting movement of said rod in a direction opposite to movement thereof by said armature and pawl levers.

5. An electromagnetic device, comprising: a core having an opening therethrough, a coil disposed about said core, the axis of said opening substantially paralleling the axis of said coil, a rod slidably mounted in said opening, a member slidably fitted over said rod, an armature having an opening therein, said armature being disposed about said rod adjacent said core, a threaded section on said rod, bearing supports on opposite sides of said member, a pawl lever pivotally mounted in each bearing support and having a face portion of a configuration to fit against said threaded section, said face portion being normally disengaged from said threaded section, and spring means for biasing said rod in said opposite direction.

6. An electromagnetic device, comprising: a core having an opening therethrough, a coil disposed about said core, the axis of said opening substantially paralleling the axis of said coil, a rod slidably mounted in said opening, a member slidably fitted over said rod, an armature having an opening therein, said armature being disposed about said rod adjacent said core, a threaded section on said rod, bearing supports on opposite sides of said member, a pawl lever pivotally mounted in each bearing support and having a face portion of a configuration to fit against said threaded section, said face portion being normally disengaged from said threaded section, and means for limiting movement of said armature in said opposite direction.

References Cited in the file of this patent

UNITED STATES PATENTS

| | | |
|---|---|---|
| 246,956 | Knowles | Sept. 13, 1881 |
| 513,111 | Jandus | Jan. 23, 1894 |
| 1,290,628 | Mayor | Jan. 7, 1919 |
| 1,645,628 | Smith | Oct. 18, 1927 |